United States Patent
Fujiwara et al.

(10) Patent No.: US 8,941,892 B2
(45) Date of Patent: Jan. 27, 2015

(54) IMAGE READER

(71) Applicants: Takashi Fujiwara, Nagakute (JP); Takuya Naniwa, Kiyosu (JP)

(72) Inventors: Takashi Fujiwara, Nagakute (JP); Takuya Naniwa, Kiyosu (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/040,894

(22) Filed: Sep. 30, 2013

(65) Prior Publication Data
US 2014/0168728 A1    Jun. 19, 2014

(30) Foreign Application Priority Data
Dec. 14, 2012    (JP) ................................. 2012-273401

(51) Int. Cl.
*H04N 1/04*    (2006.01)
*H04N 1/00*    (2006.01)

(52) U.S. Cl.
CPC ................................. *H04N 1/00551* (2013.01)
USPC ............................ 358/474; 358/498; 271/164

(58) Field of Classification Search
CPC ........... B65H 2402/61; B65H 2402/64; B65H 2404/144; B65H 2404/6111; B65H 2405/113; B65H 2405/313; B65H 2405/332; B65H 2553/612; B65H 5/26; B65H 7/02; G03G 15/6502; G03G 21/1638; G03G 2215/00383
USPC .......... 358/474, 487, 496, 497, 498; 271/164, 271/264, 9.13
See application file for complete search history.

(56) References Cited

U.S. PATENT DOCUMENTS

| | | | |
|---|---|---|---|
| 5,048,540 A * | 9/1991 | Ramond | 607/152 |
| 6,598,870 B2 * | 7/2003 | Hanano | 271/138 |
| 7,154,642 B2 * | 12/2006 | Lichtfuss | 358/497 |
| 7,343,107 B2 * | 3/2008 | Fujimaru et al. | 399/27 |
| 7,430,065 B2 * | 9/2008 | Arakai et al. | 358/3.26 |
| 7,796,310 B2 * | 9/2010 | Hasegawa et al. | 358/488 |
| 7,995,254 B2 * | 8/2011 | Edwards et al. | 358/497 |
| 8,130,423 B2 * | 3/2012 | Nakano et al. | 358/474 |
| 8,610,974 B2 * | 12/2013 | Takeuchi et al. | 358/498 |
| 8,842,346 B2 * | 9/2014 | Honda | 358/496 |
| 2005/0140991 A1 * | 6/2005 | Ogiwara et al. | 358/1.2 |
| 2006/0193533 A1 * | 8/2006 | Araki et al. | 382/275 |
| 2008/0137987 A1 * | 6/2008 | Kojima et al. | 382/275 |

FOREIGN PATENT DOCUMENTS

| | | |
|---|---|---|
| JP | 2011-015046 A | 1/2011 |
| JP | 2011-077648 A | 4/2011 |

* cited by examiner

*Primary Examiner* — Negussie Worku
(74) *Attorney, Agent, or Firm* — Banner & Witcoff, Ltd.

(57) ABSTRACT

An image reader is provided that includes a housing, a sheet support surface disposed at the housing and configured to support a sheet placed thereon, a conveyor that includes a roller and conveys the sheet in a first direction, a drive unit generating a driving force for driving the conveyor, an image sensor unit reading an image on the sheet being conveyed by the conveyor, a cover configured to rotate between an open position to expose the roller and a closed position to cover the roller around a rotational axis extending in a second direction perpendicular to the first direction, and a detector configured to output a first signal when the cover is in the closed position and output a second signal when the cover is in the open position, the detector disposed on a same side as the drive unit in the second direction with respect to the sheet support surface.

10 Claims, 12 Drawing Sheets

IMAGE READER

CROSS-REFERENCE TO RELATED APPLICATION

This application claims priority under 35 U.S.C. §119 from Japanese Patent Application No. 2012-273401 filed on Dec. 14, 2012. The entire subject matter of the application is incorporated herein by reference.

BACKGROUND

1. Technical Field

The following description relates to one or more image readers.

2. Related Art

An image reader has been known that is configured to read an image on a sheet while the sheet is conveyed through a conveyance path in a housing.

The known image reader may have a cover, for removing a jammed sheet, which is configured to be opened and closed relative to the housing. When the cover is open, the conveyance path is open and exposed. For example, when a sheet jam occurs on the conveyance path, it is possible to remove a jammed sheet after opening the cover.

When sheet feeding is started in a situation where the cover remains opened after removal of the jammed sheet, a sheet feeding error occurs. Therefore, the known image reader includes a sensor for detecting whether the cover is open or closed. When the sensor detects that the cover is open, a motor for generating a driving force for the sheet feeding is stopped in order to prohibit the start of the sheet feeding.

SUMMARY

In the above configuration, the sensor and the motor need to be disposed in an ingenious manner. An improper layout of the sensor and the motor might make it difficult to lay harnesses extending from the sensor and the motor, and/or might require a large space for disposing the sensor and the motor.

Aspects of the present invention are advantageous to provide one or more improved techniques that make it possible to downsize an image reader and easily lay harnesses in the image reader.

According to aspects of the present invention, an image reader is provided, which includes a housing, a sheet support surface disposed at the housing and configured to support a sheet placed thereon, a conveyor including a roller, the conveyor configured to convey in a first direction the sheet placed on the sheet support surface, a drive unit configured to generate a driving force for driving the conveyor, an image sensor unit configured to read an image on the sheet being conveyed by the conveyor, a cover configured to rotate between an open position to expose the roller and a closed position to cover the roller, around a rotational axis extending in a second direction perpendicular to the first direction, and a detector configured to output a first signal when the cover is in the closed position and output a second signal different from the first signal when the cover is in the open position, the detector disposed on a same side as the drive unit with respect to the sheet support surface in the second direction.

DETAILED DESCRIPTION

It is noted that various connections are set forth between elements in the following description. It is noted that these connections in general and, unless specified otherwise, may be direct or indirect and that this specification is not intended to be limiting in this respect.

Hereinafter, an embodiment according to aspects of the present invention will be described with reference to the accompanying drawings.

<External Configuration>

Figure 1:
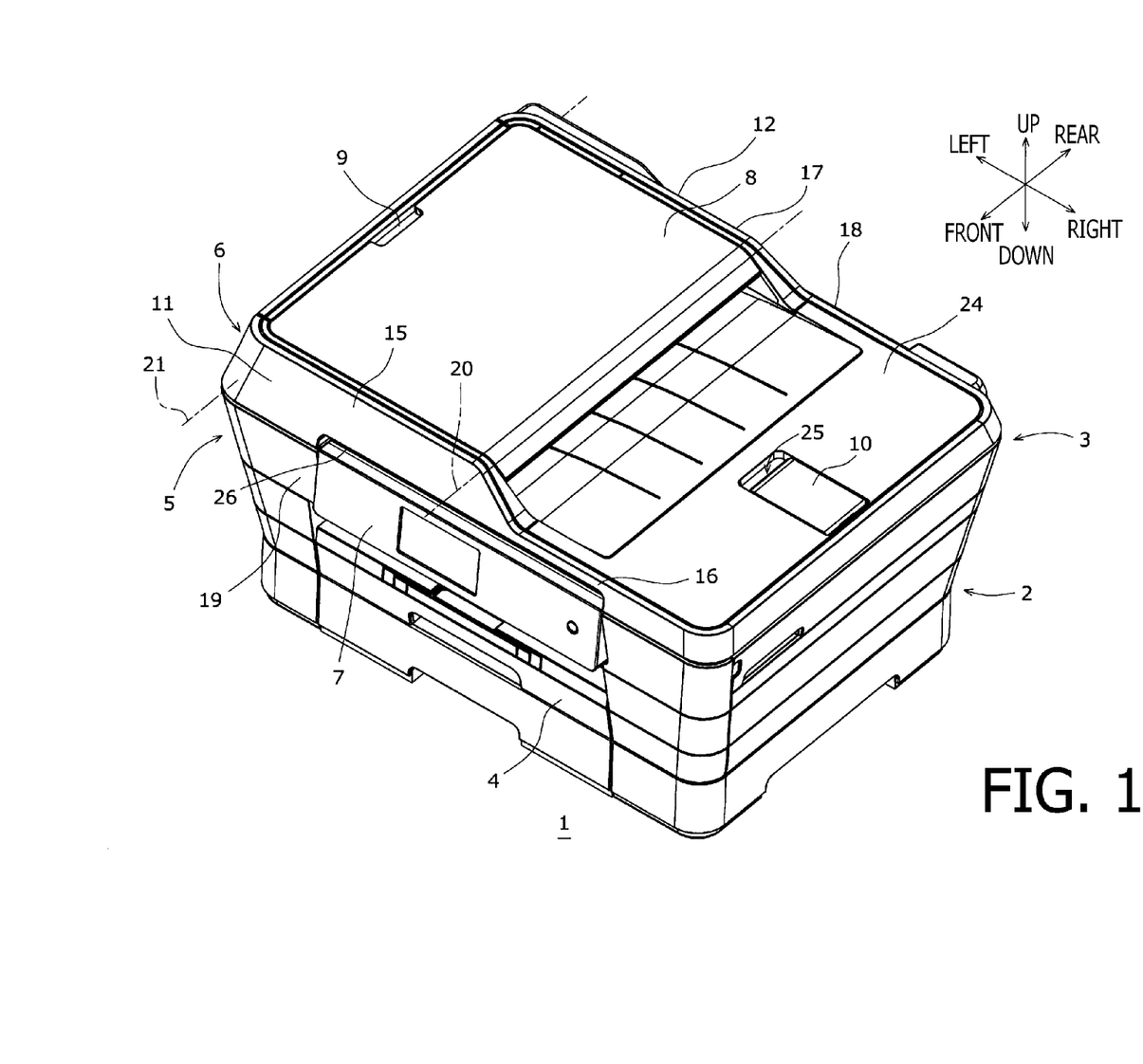
FIG. 1 is a perspective view of a multi-function peripheral (MFP) including an image reading unit from an upper right front side in an embodiment according to one or more aspects of the present invention.

As shown in FIG. 1, a multi-function peripheral (MFP) 1 includes an image forming unit 2 and an image reading unit 3.

The image forming unit 2 includes a feed cassette 4 configured to hold sheets placed therein. The image forming unit 2 may be configured to employ an inkjet printing method to form an image on a sheet fed from the feed cassette 4 by directly jetting ink droplets onto the sheet. Alternatively, the image forming unit 2 may be configured to employ an electrophotographic printing method to form an image on a sheet fed from the feed cassette 4 by transferring and fixing a toner image onto the sheet.

The image reading unit 3 includes an FB scanner housing 5 (a housing of a flat-bed scanner), an ADF housing 6 (a housing of an automatic document feeder), an operation unit 7, a tray 8, a cover 9, and a stopper 10.

It is noted that, in the following descriptions, various directions with respect to the MFP 1 such as a vertical direction, a left-to-right direction, and a front-to-rear direction will be defined as shown in the accompanying drawings. Namely, various sides with respect to the MFP 1 such as an upper side (upside), a lower side (downside), a left side, a right side, a front side, and a rear side will be defined as shown in the accompanying drawings. Further, a conveyance direction of a sheet S will represent the left-to-right direction. A width direction of the sheet S will represent the front-to-rear direction. A direction perpendicular to the conveyance direction and the width direction of the sheet S will represent the vertical direction.

The FB scanner housing 5 is disposed above the image forming unit 2 and configured to read an image on a statically-placed document sheet.

The ADF housing 6 includes a front plate 11 and a rear plate 12. The front plate 11 and the rear plate 12 are disposed to face each other with a distance therebetween in the front-to-rear direction. A left portion 15, which is approximately a left half of the front plate 11, is longer in the vertical direction than a right portion 16 that is the remainder of the front plate 11. Therefore, an upper end of the left portion 15 is located higher than an upper end of the right portion 16. Further, a left portion 17, which is approximately a left half of the rear plate 12, is longer in the vertical direction than a right portion 18 that is the remainder of the rear plate 12. Therefore, an upper end of the left portion 17 is located higher than an upper end of the right portion 18. In addition, each of the front plate 11 and the rear plate 12 is inclined such that a higher portion thereof is located more inside in the front-to-rear direction, so as to make the image reading unit 3 appear compact.

Further, the ADF housing 6 includes an opening 26. The opening 26 is formed by cutting off upward a middle portion of a lower end of the front plate 11 in the left-to-right direction. When a user's finger or the like is inserted into the opening 26, and the ADF housing 6 is lifted, the ADF housing 6 is separated from and opened relative to the FB scanner housing 5.

The operation unit 7 is disposed at a front face 19 of the FB scanner housing 5. Thereby, the operation unit 7 is opposite to a detector 81 with respect to a below-mentioned feed tray 41. The operation unit 7 may include a touch panel. The operation unit 7 is configured to accept operations by a user who configures various settings, and to display information such as the configured settings.

The tray 8 is disposed to bridge a distance between the left portion 15 of the front plate 11 and the left portion 17 of the rear plate 12. The tray 8 is configured to rotate between a cover position shown in FIG. 1 and a tray position shown in FIG. 2, around a rotational axis 20 extending in the front-to-rear direction between respective upper right ends of the left portions 15 and 17. The tray 8, in the cover position, extends along respective upper ends of the left portions 15 and 17 so as to over the cover 9 from above. The tray 8, in the tray position, extends upward to the right from respective right ends of the left portions 15 and 17.

The cover 9 is disposed to bridge a distance between the left portion 15 of the front plate 11 and the left portion 15 of the rear plate 12. The cover 9 is configured to rotate between a closed position shown in FIG. 3 and an open position shown in FIG. 4, around a rotational axis 21 extending in the front-to-rear direction between respective lower left ends of the left portions 15 and 17.

Figure 2:
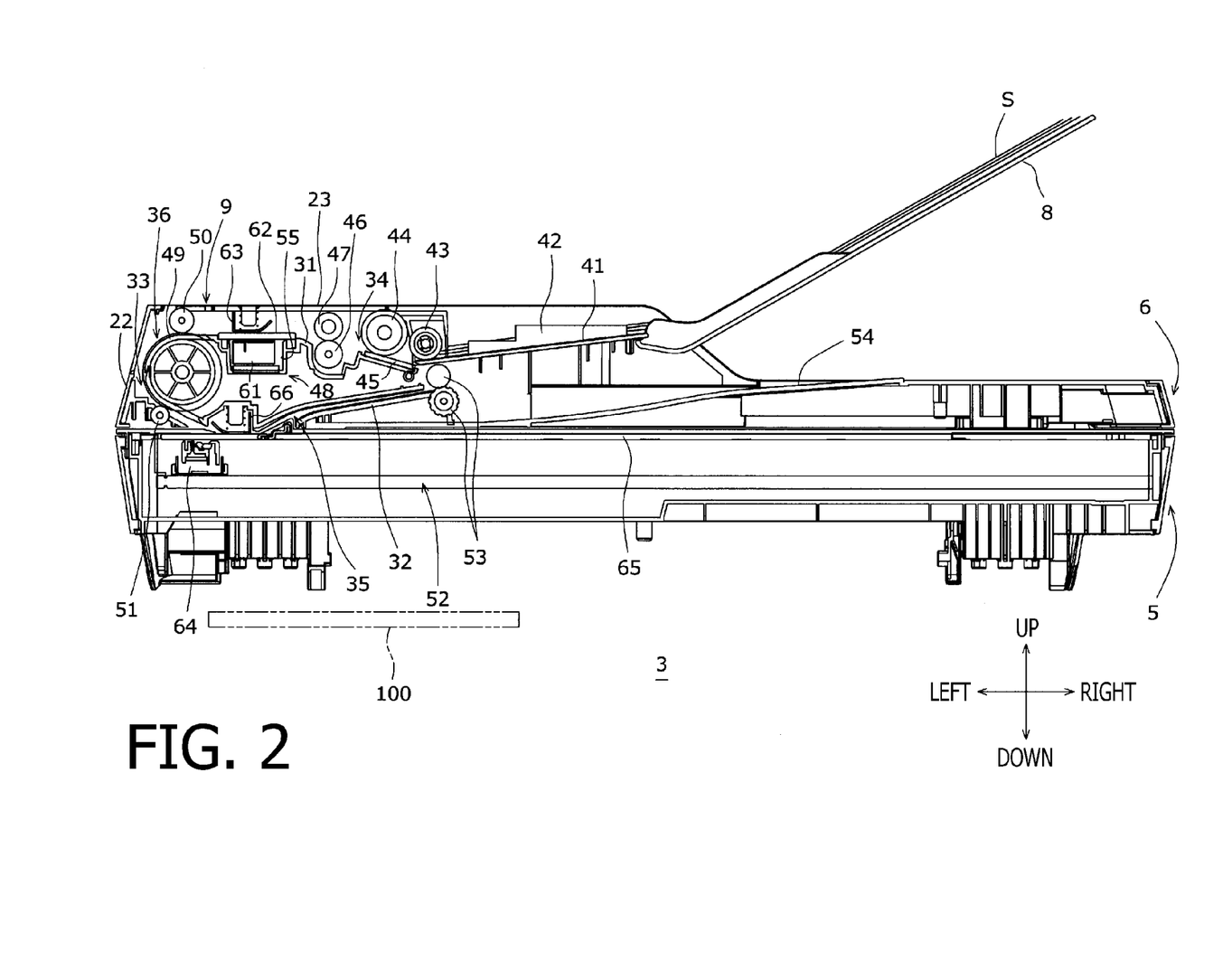
FIG. 2 is a cross-sectional front view of the image reading unit in the embodiment according to one or more aspects of the present invention.

As shown in FIG. 2, the cover 9 includes a side portion 22 and an upper portion 23. When the cover is in the closed position, the side portion 22 extends along respective left ends of the left portions 15 and 17, and the upper portion 23 extends along the respective upper ends of the left portions 15 and 17. The side portion 22 is inclined such that a higher portion thereof is positioned more inside in the left-to-right direction, so as to make the image reading unit 3 appear compact. When the cover 9 is in the open position, the upper portion 23 extends substantially in the vertical direction. Further, when the cover 9 is in the open position, a below-mentioned upper path 34 is opened, and a below-mentioned second LF roller 49 is exposed. When the cover 9 is in the closed position, the second LF roller 49 is covered with the cover 9.

The stopper 10 is disposed in a concave portion 25 formed in an upper face 24 of the ADF housing 6. The stopper 10 is configured to rotate between a housed position and a deployed position, around a rotational axis extending in the front-to-rear direction at a right end of the concave portion 25. In the housed position, the stopper 10 is housed in the concave portion 25. In the deployed position, the stopper 10 extends upward to the right from the right end of the concave portion 25.

<Internal Configuration>

As shown in FIG. 2, the ADF housing 6 includes an internal frame 31 and a lower frame 32.

The internal frame 31 is disposed below the upper portion 23 of the cover 9 in the closed position.

The lower frame 32 is disposed below the internal frame 31.

There is a gap between an inner surface of the cover 9 and the internal frame 31. Thereby, a conveyance path 33 for conveying the document sheet S therethrough is formed between the inner surface of the cover 9 and the internal frame 31. Further, there is a gap between. Thereby, the conveyance path 33 is formed between the internal frame 31 and the lower frame 32. The conveyance path 33 includes an upper path 34 located in an upper position, a lower path 35 located below the upper path 34, and a curving path 36 connecting the upper path 34 and the lower path 35. The upper path 34 extends along the left-to-right direction between the inner surface of the cover 9 and the internal frame 31. The lower path 35 extends along the left-to-right direction between the internal frame 31 and the lower frame 32. The curving path 36 is curved along a circumferential surface of the below-mentioned second LF roller 49.

The image reading unit 3 includes, in a conveyance direction of the sheet S along the conveyance path 33, a feed tray 41, two width guides 42, a document sensor 999, a pickup roller 43, a separation roller 44, a separation pad 45, a first LF roller 46, a first driven roller, a first reader 48, a second LF roller 49, a second driven roller 50, a third driven roller 51, a second reader 52, two ejection rollers 53, and a catch tray 54.

It is noted that the following descriptions, unless specified otherwise, will be provided under an assumption that the cover 9 is in the closed position.

The feed tray 41 is disposed below a right end of the cover 9 with a gap therebetween. The feed tray 41 extends upward to the right. For example, the sheet S to be read is placed to straddle the feed tray 41 and the tray 8 in the tray position.

The two width guides 42 is provided at the feed tray 41 and disposed to face each other in the front-to-rear direction. The two width guides 42 are configured to move closer to and farther away from each other by the same moving distance with respect to a central point between the two width guides 42 in the front-to-rear direction. A gap between the two width guides 42 is adjusted to fit a width of the sheet S on the feed tray 41 in the front-to-rear direction. The sheet S is inserted and put from the right onto an area between the two width guides 42. Thereby, the sheet S is placed on the feed tray 41 such that a center of the sheet S is positionally coincident with the central point between the two width guides 42 in the front-to-rear direction.

The document sensor 999 is provided at the feed tray 41 and configured to detect whether there is a sheet S on the feed tray 41.

The pickup roller 43 is supported to be rotatable around a rotational axis extending in the front-to-rear direction, between the left portion 15 of the front plate 11 and the left portion 17 of the rear plate 12. A circumferential surface of the pickup roller 43 is configured to contact, from above, a left end portion of the feed tray 41 on the upper path 34.

The separation roller 44 is disposed on a left side of the pickup roller 43. The separation roller 44 is supported to be rotatable around a rotational axis extending in the front-to-rear direction, between the left portion 15 of the front plate 11 and the left portion 17 of the rear plate 12.

The separation pad 45 is disposed under the separation roller 44. The separation pad 45 is held by the internal frame 31. The separation pad 45 is configured to elastically contact a circumferential surface of the separation roller 44 on the upper path 34, from beneath.

The first LF roller 46 is disposed on a left side of the separation pad 45. The first LF roller 46 is supported to be rotatable around a rotational axis extending in the front-to-rear direction, between the left portion 15 of the front plate 11 and the left portion 17 of the rear plate 12.

The first driven roller 47 is disposed above the first LF roller 46. The first driven roller 47 is supported to be rotatable around a rotational axis extending in the front-to-rear direction, between the left portion 15 of the front plate 11 and the left portion 17 of the rear plate 12. A circumferential surface of the first driven roller 47 contacts a circumferential surface of the first LF roller 46 on the upper path 34. The first driven roller 47 is configured to rotate following the rotation of the first LF roller 46.

The first reader 48 includes a contact image sensor (CIS) module 61, and a contact glass 62, and a document holder 63.

The CIS module 61 is disposed on a left side of the first LF roller 46. The CIS module 61 is put in a concave portion 55, which is formed at the internal frame 31 to be recessed downward. The CIS module 61 extends in the front-to-rear direction inside the concave portion 55. The CIS module 61 includes therein an LED light source, a lens, and an image sensor.

The contact glass 62 is disposed above the CIS module 61 so as to cover the concave portion 55. An upper face of the contact glass 62 faces the upper path 34.

The document holder 63 is disposed above the contact glass 62 and supported by the cover 9. The document holder 63 is configured to elastically contact the upper face of the contact glass 62 on the upper path 34.

The second LF roller 49 is disposed at a left end portion of the internal frame 31. The second LF roller 49 is supported to be rotatable around a rotational axis extending in the front-to-rear direction, between the left portion 15 of the front plate 11 and the left portion 17 of the rear plate 12.

The second driven roller 50 is disposed above the second LF roller 49. The second driven roller 50 is supported to be rotatable around a rotational axis extending in the front-to-rear direction, between the left portion 15 of the front plate 11 and the left portion 17 of the rear plate 12. A circumferential surface of the second driven roller 50 contacts a circumferential surface of the second LF roller 49 on the curving path 36. The second driven roller 50 is configured to rotate following the rotation of the second LF roller 49.

The third driven roller 51 is disposed on a lower left side of the second LF roller 49. The third driven roller 50 is supported to be rotatable around a rotational axis extending in the front-to-rear direction, between the left portion 15 of the front plate 11 and the left portion 17 of the rear plate 12. A circumferential surface of the third driven roller 51 contacts the circumferential surface of the second LF roller 49 on the curving path 36. The third driven roller 51 is configured to rotate following the rotation of the second LF roller 49.

The second reader 52 includes a CIS module 64, a contact glass 65, and a document holder 66.

The CIS module 64 is provided at the FB scanner housing 5 so as to be movable along the left-to-right direction. The CIS module 64 extends in the front-to-rear direction. The CIS module 64 includes therein an LED light source, a lens, and an image sensor. The CIS module 61 is located under a left end portion of the contact glass 65, for example, when an ADF reading operation is performed, or the image reading unit 1 is not used.

The contact glass 65 is disposed at an upper portion of the FB scanner housing 5.

The document holder 66 is disposed above the left end portion of the contact glass 65. The document holder 66 is elastically supported by the internal frame 31. The document holder 66 is configured to elastically contact an upper face of the contact glass 65 on the lower path 35.

The two ejection rollers 53 are disposed below the left end portion of the feed tray 41. The upper one of the ejection rollers 53 is disposed at the internal frame 31. The lower one of the ejection rollers 53 is disposed at the lower frame 32. Each ejection roller 53 is supported to be rotatable around a rotational axis extending in the front-to-rear direction, between the left portion 15 of the front plate 11 and the left portion 17 of the rear plate 12. A circumferential surface of the lower ejection roller 53 contacts a circumferential surface of the upper ejection roller 53 on the lower path 35. The lower ejection roller 53 is configured to rotate following the rotation of the upper ejection roller 53.

The catch tray 54 is disposed below the feed tray 41. A right end portion of the catch tray 54 is located lower than an exit of the lower path (a downstream end of the lower path in the conveyance direction). The catch tray 54 extends upward to the right.

<Image Reading Operation>

As shown in FIG. 2, when the image reading unit 1 performs an ADF reading operation to read an image on the sheet S, the tray 8 is opened to the tray position, and the cover 9 is closed. As described above, the sheet S is placed on the feed tray 41 and the tray 8 such that the center of the sheet S is positionally coincident with the central point between the two width guides 42 in the front-to-rear direction. In the following descriptions, an upward-facing side of the sheet S placed on the feed tray 41 and the tray 8 may be referred to as a first side of the sheet S. Further, a downward-facing side of the sheet S placed on the feed tray 41 and the tray 8 may be referred to as a second side of the sheet S.

A leading end of the sheet S is located on the circumferential surface of the pickup roller 43. When the pickup roller 43 is rotated clockwise in a front view (e.g., in FIG. 2), due to forces such as a frictional force generated between the circumferential surface of the pickup roller 43 and an upward-facing side of a top one of sheets S on the feed tray 41, the top sheet S is fed to a position between the separation roller 44 and the separation pad 45.

The separation roller 44 is rotated clockwise in the front view (e.g., in FIG. 2). When the leading ends of sheets S are nipped between the separation roller 44 and the separation pad 45, the sheets S are separated on a sheet-by-sheet basis, and a single sheet S is conveyed through the upper path 34 after passing between the separation roller 44 and the separation pad 45.

The first LF roller 46 is rotated counterclockwise in the front view (e.g., in FIG. 2). The first driven roller 47 is rotated clockwise in the front view (e.g., in FIG. 2), in response to the rotation of the first LF roller 46. When the leading end of the sheet S, which is being conveyed through the upper path 34, reaches a contact point between the respective circumferential surfaces of the first LF roller 46 and the first driven roller 47, a feeding force is applied to the sheet S from the first LF roller 46 and the first driven roller 47.

Then, the sheet S passes between the upper face of the contact glass 62 and the document holder 63. At this time, the LED light source of the CIS module 61 emits light onto the sheet S on the contact glass 62. The image sensor of the CIS module 61 receives reflected light from the sheet S and reads an image formed on the second side of the sheet S.

Afterward, the leading end of the sheet S is conveyed from the upper path 34 to the curving path 36 by the feeding force from the first LF roller 46 and the first driven roller 47. The second LF roller 49 is rotated counterclockwise in the front view (e.g., in FIG. 2). The second driven roller 50 and the third driven roller 51 are rotated clockwise in the front view (e.g., in FIG. 2). When the leading end of the sheet S reaches a contact point between the respective circumferential surfaces of the second LF roller 49 and the second driven roller 50, a feeding force is applied to the sheet S from the second LF roller 49 and the second driven roller 50. Thereafter, when the leading end of the sheet S reaches a contact point between the respective circumferential surfaces of the second LF roller 49 and the third driven roller 51, the sheet S is provided with a feeding force from the second LF roller 49 and the third driven roller 51, and is conveyed from the curving path 36 to the lower path 35.

The sheet S conveyed to the lower path 35 passes between the upper face of the left end portion of the contact glass 65 and the document holder 66. At this time, the LED light source of the CIS module 64 emits light onto the sheet S on the left end portion of the contact glass 65. Then, the image sensor of the CIS module 64 receives reflected light from the sheet S and reads an image formed on the first side of the sheet S.

The upper ejection roller 53 is rotated counterclockwise in the front view (e.g., in FIG. 2). The lower ejection roller 53 is rotated clockwise in the front view (e.g., in FIG. 2), in response to the rotation of the upper ejection roller 53. When the leading end of the sheet S reaches a contact point between the two ejection rollers 53, the sheet S is provided with a feeding force from the two ejection rollers 53 and ejected onto the catch tray 54.

<Motor>

Figure 5:
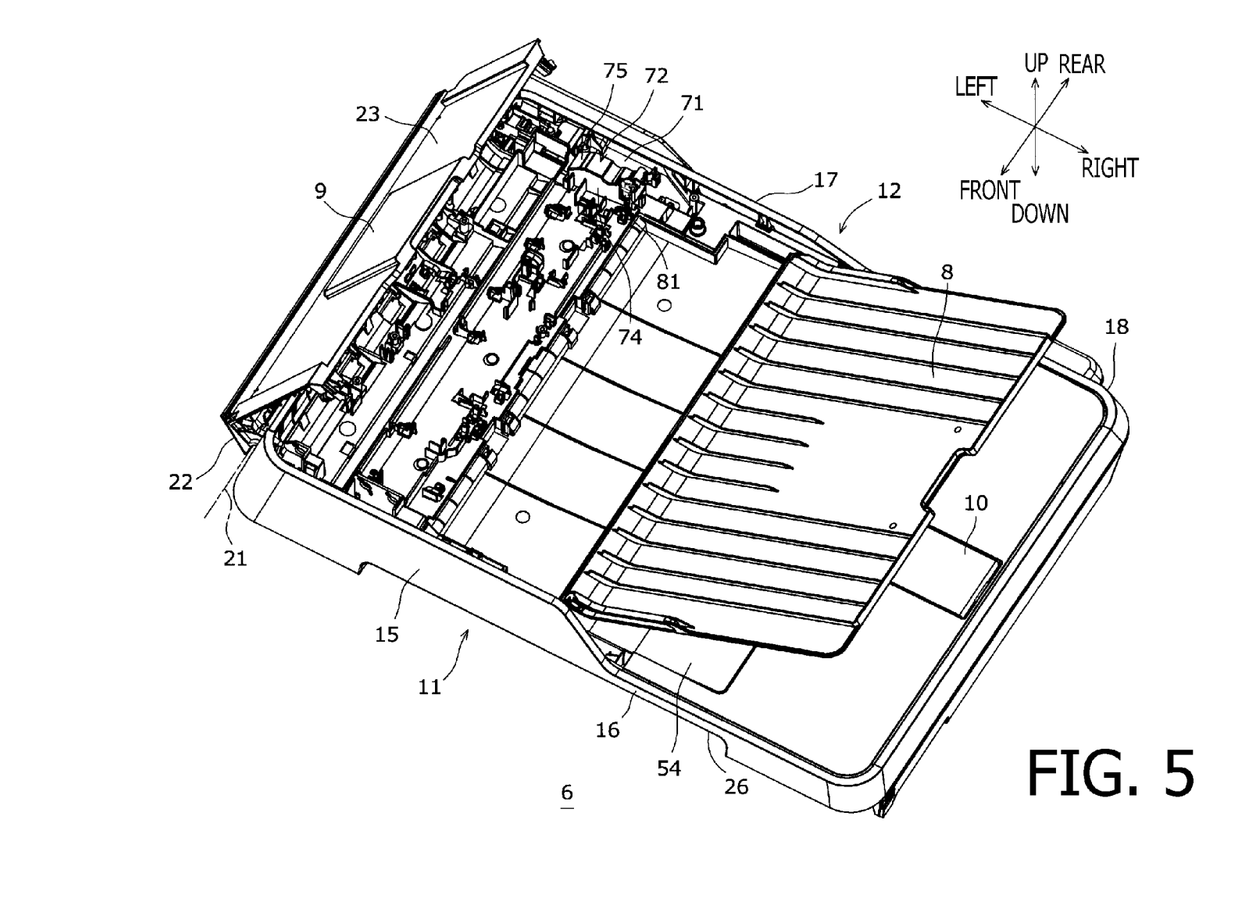
FIG. 5 is a perspective view, from the upper right front side, of the ADF housing in a state where an internal frame is removed, and the cover is in the open position in the embodiment according to one or more aspects of the present invention.
Figure 6:
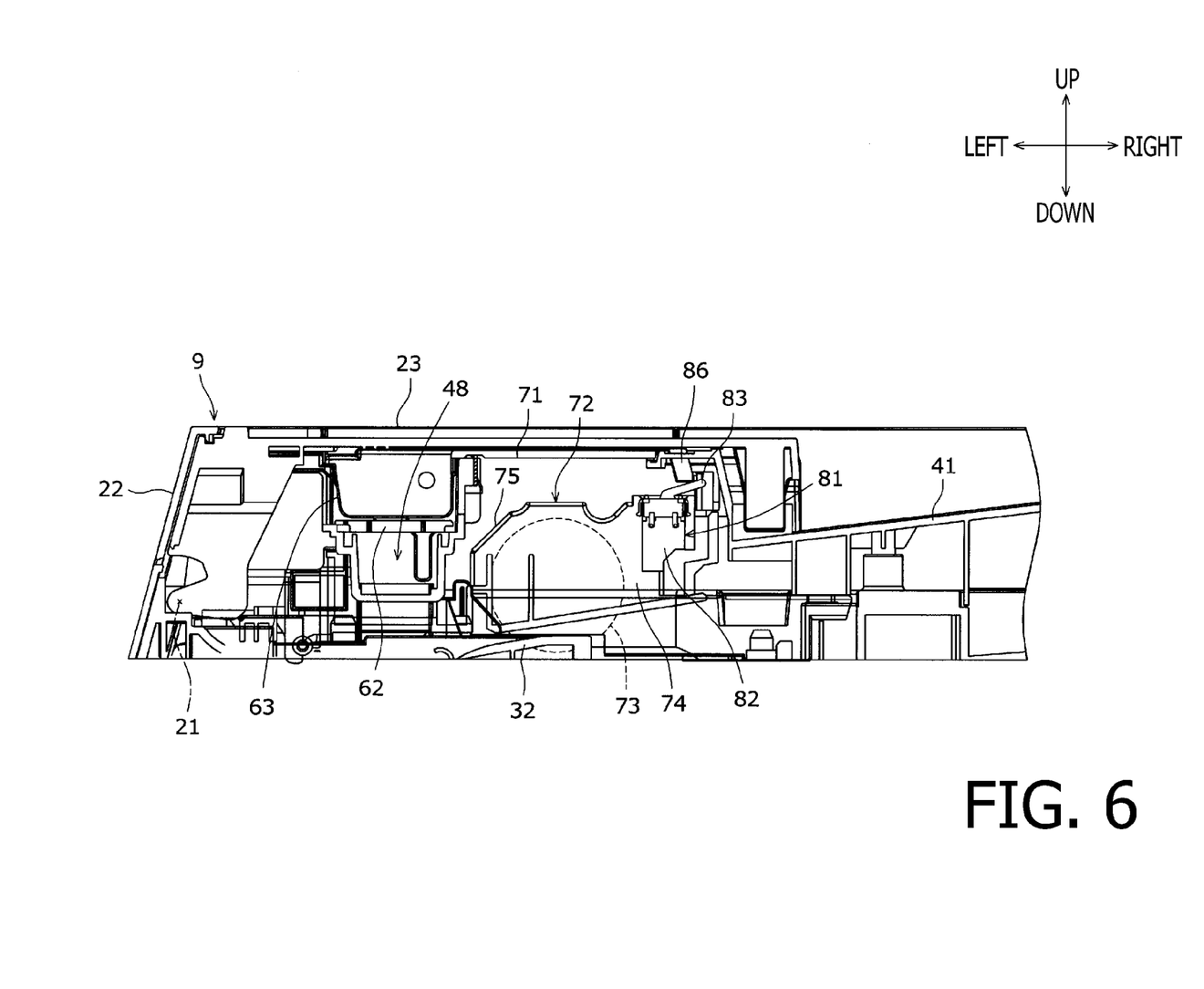
FIG. 6 is a cross-sectional front view showing a left rear end portion of the ADF housing in a state where the internal frame is removed, and the cover is in the closed position in the embodiment according to one or more aspects of the present invention.
Figure 7:
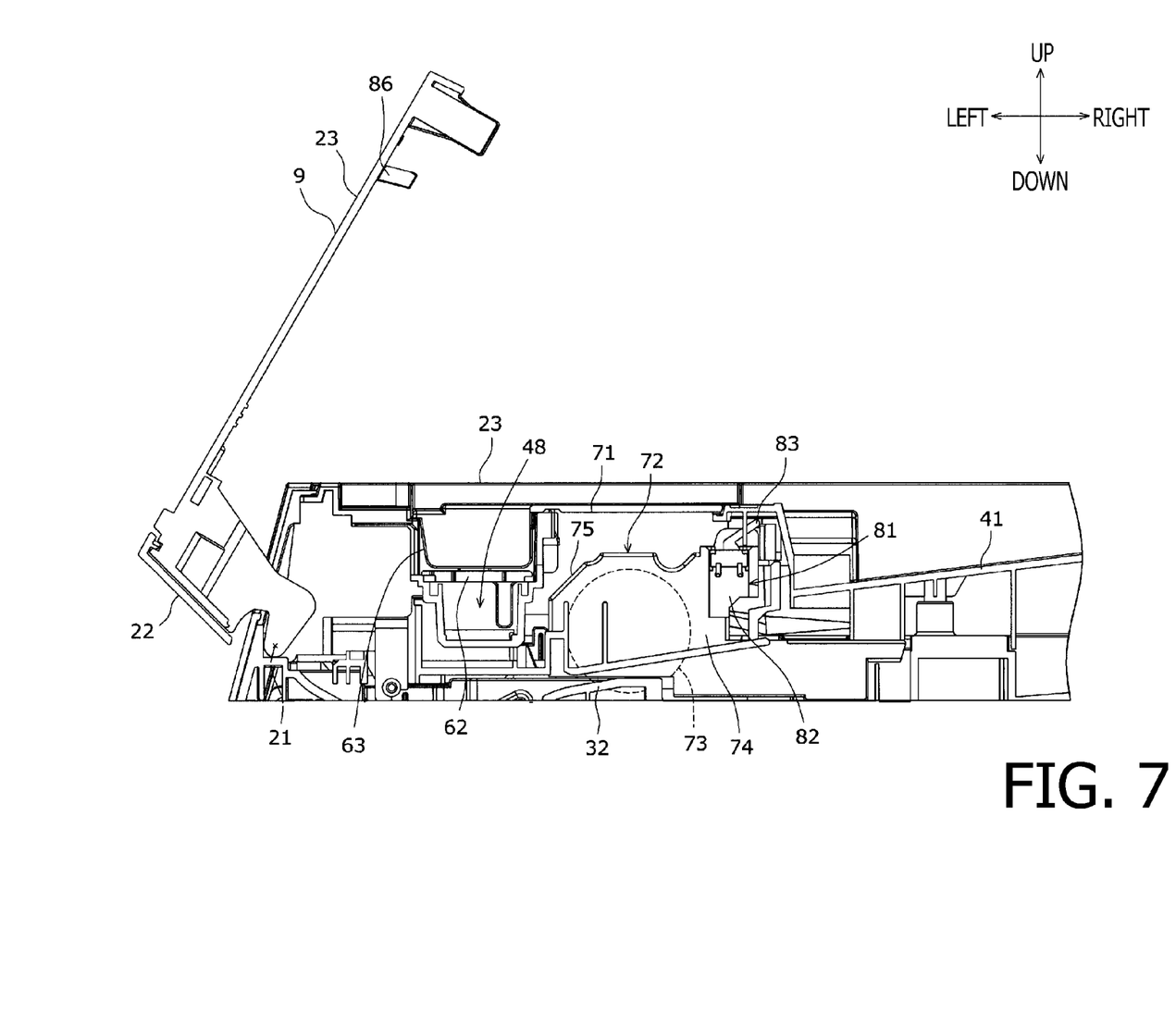
FIG. 7 is a cross-sectional front view showing the left rear end portion of the ADF housing in a state where the internal frame is removed, and the cover is in the open position in the embodiment according to one or more aspects of the present invention.

As shown in FIGS. 5, 6, and 7, the image reading unit 3 includes a drive frame 71, a motor frame 72, and a motor 73.

The drive frame 71 is formed from sheet-metal. The drive frame 71 is disposed in front of the left portion 17 of the rear plate 12.

The motor frame 72 is attached to a front face of the drive frame 71. The motor frame 72 includes a front plate portion 74 and a circumferential plate portion 75. The front plate portion 74 extends in parallel with the drive frame 71, in front of the drive frame 71. The circumferential plate portion 75 extends rearward from a circumferential edge of the front plate portion 74, and is connected with the front face of the drive frame 71.

As shown in FIGS. 6 and 7, the motor 73 is placed in the motor frame 72. Specifically, the motor 73 is disposed between the drive frame 71 and a left portion of the front plate portion 74. The motor frame 72 covers a front face and a circumferential surface of the motor 73. Thereby, it is possible to prevent the entry of foreign substances into the motor 73. Further, the motor frame 72 is configured to form a part of members for defining the conveyance path 33. An output shaft of the motor 73 extends rearward, and is inserted into the drive frame 71. A driving force generated by the motor 73 is transmitted to the pickup roller 43, the separation roller 44, the first LF roller 46, the second LF roller 49, and the upper ejection roller 53, via a gear mechanism (not shown) supported by the drive frame 71.

Figure 8:
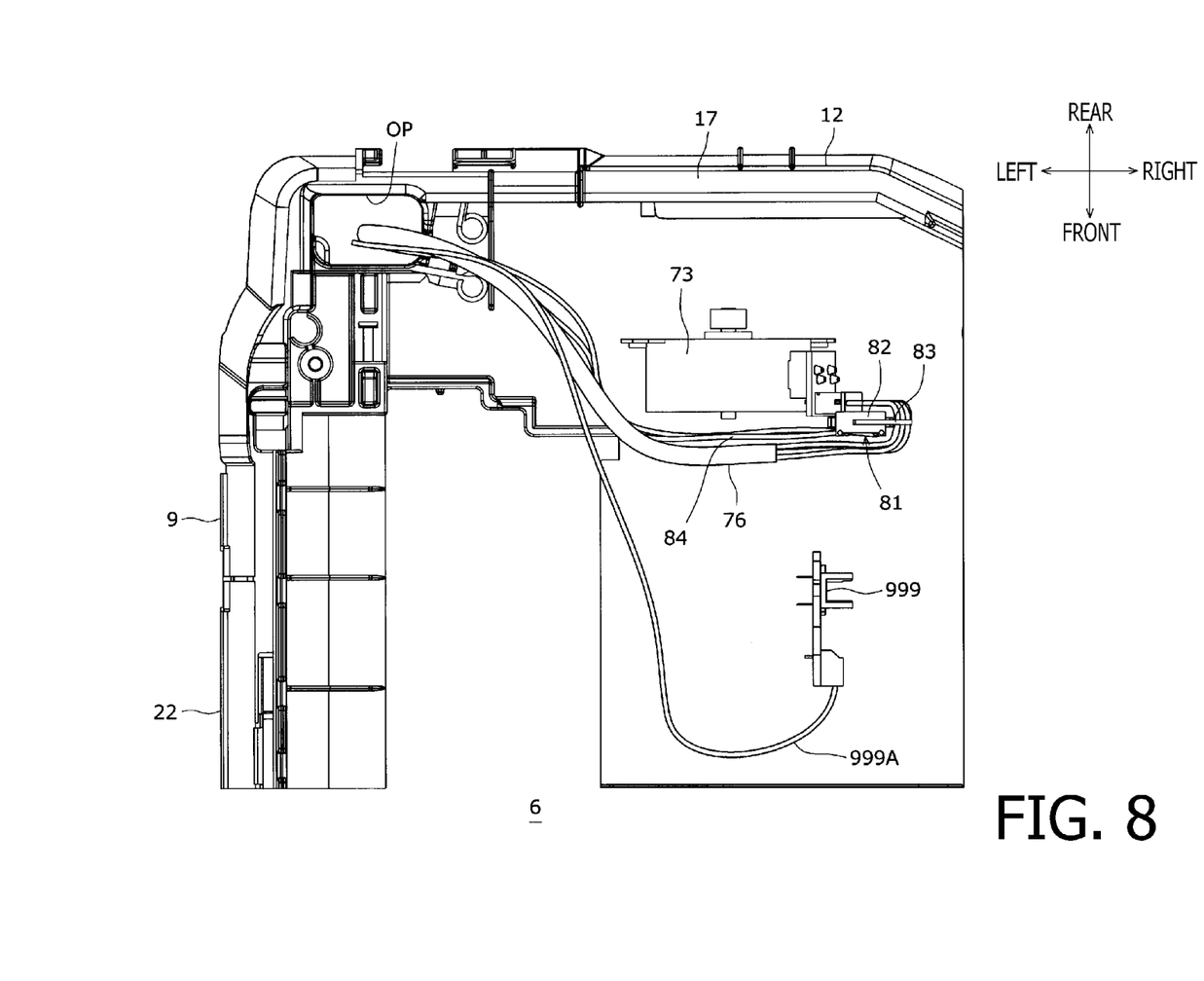
FIG. 8 is a top view showing a layout of a motor, a detector, a motor harness, and a sensor harness in the left rear end portion of the ADF housing in the embodiment according to one or more aspects of the present invention.

As shown in FIG. 8, the motor 73 includes a motor harness 76. The motor harness 76 extends rightward from the motor 73, and, after being turned around leftward, extends toward a left rear end of the ADF housing 6. The motor 73 is supplied with electricity from a power supply (not shown) via the motor harness 76. The motor harness 76 is connected with a control board 100 provided at the image forming unit 2, via an opening OP.

<Opening-Closing Detecting Mechanism>

As shown in FIGS. 5 to 8, the image reading unit 3 includes the detector 81 configured to detect whether the cover 9 is open or closed.

The detector 81 includes a mechanical switch. More specifically, as shown in FIGS. 6 to 8, the detector 81 includes a sensor 82, an actuator 83, and a sensor harness 84.

The sensor 82 is attached to an upper right end portion of a front face of the motor frame 72. Thereby, the detector 81 is disposed behind the feed tray 41, as in the case of the motor 73. Further, the detector 81 is disposed opposite to the rotational axis 21 of the cover 9 with respect to the motor 73. As shown in FIG. 8, a rear end of the sensor 82 is positionally coincident with a front end of the motor 73 in the front-to-rear direction. Further, as shown, e.g., in FIG. 8, a part of the detector 81 is positionally coincident with a part of the motor 73 in the left-to-right direction. In addition, as shown, e.g., in FIGS. 6 and 7, a part of the detector 81 is positionally coincident with a part of the motor 73 in the vertical direction.

The actuator 83 protrudes from an upper face of the sensor 82, and extends upward to the right. The actuator 83 is configured to move between a lower position shown in FIG. 6 and an upper position shown in FIG. 7.

As shown in FIG. 8, the sensor harness 84 extends from a front face of the sensor 82. The sensor harness 84 extends toward the left rear end of the ADF housing 6, substantially along a portion of the motor harness 76 that extends from the turn-around portion toward the left rear end of the ADF housing 6. A tip of the sensor harness 84 is connected with the control board 100 provided at the image forming unit 2, via the opening OP. Moreover, a harness 999A extending from the document sensor 999 is also connected with the control board 100 provided at the image forming unit 2, via the opening OP.

For example, when the actuator 83 is in the lower position, a contact point (not shown) in the sensor 82 is closed, and an ON signal (such as a high-level signal) flows through the sensor harness 84. Meanwhile, when the actuator 83 is in the upper position, the contact point (not shown) in the sensor 82 is open, and an OFF signal (such as a low-level signal) flows through the sensor harness 84.

Figure 4:
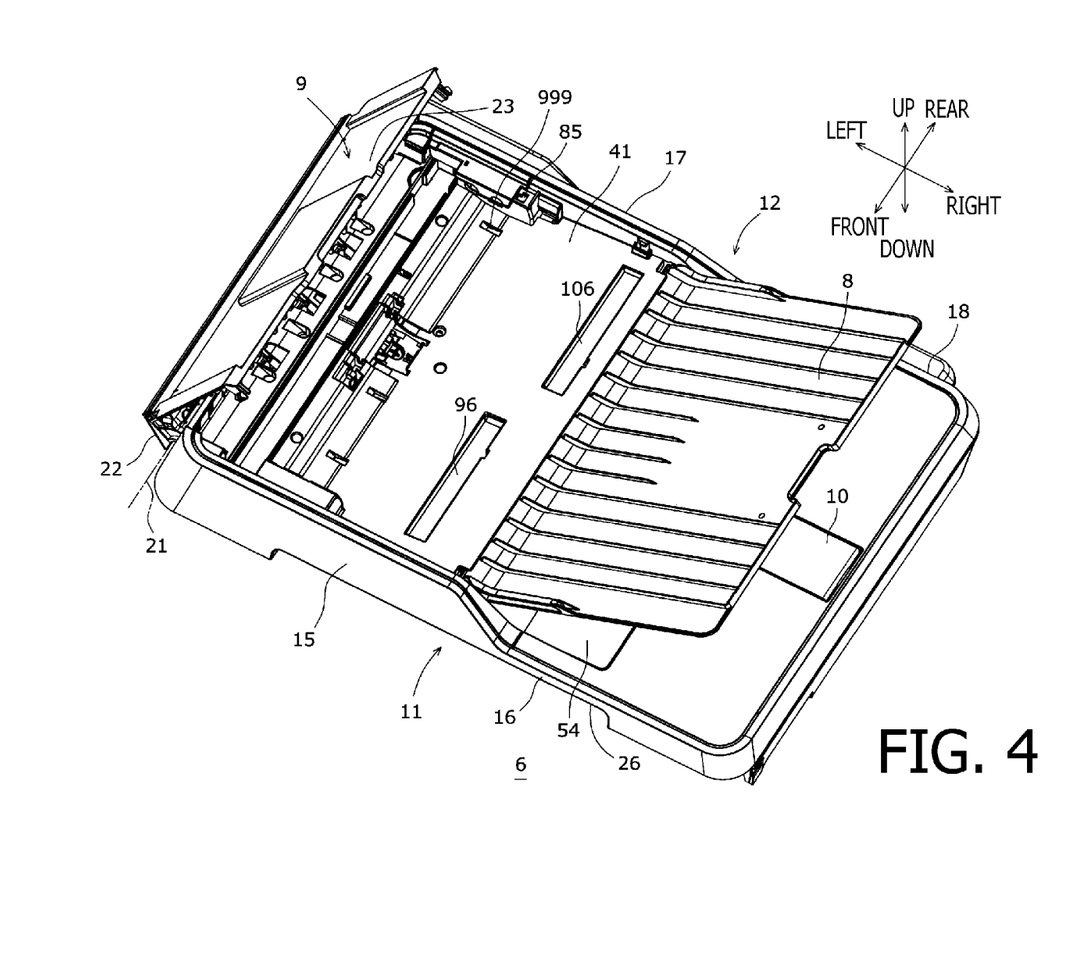
FIG. 4 is a perspective view, from the upper right front side, of the ADF housing in a state where the width guides are removed, and the cover is in an open position in the embodiment according to one or more aspects of the present invention.

As shown in FIG. 4, the internal frame 31 includes an insertion hole 85. The insertion hole 85 is formed to penetrate the internal frame 31 in the vertical direction, above the actuator 83 of the detector 81.

As shown in FIGS. 6 and 7, the cover 9 includes a projection 86.

The projection 86 is provided to protrude from a right rear end portion of an inner surface of the cover 9. The projection 86 is inclined with respect to a direction perpendicular to the inner surface of the cover 9 such that a portion closer to a tip thereof is further on the right side. More specifically, the projection 86 extends along a tangent of an arc-shaped trajectory drawn by a base end portion of the projection 86 when the cover 9 rotates.

When the cover 9 is in the closed position, as shown in FIG. 6, the projection 86 is inserted through the insertion hole 85. Then, the tip of the projection 86 contacts the actuator 83 of the detector 81 from above. Thereby, the actuator 83 is pressed down by the projection 86 and put in the lower position. Therefore, the ON signal is transmitted through the sensor harness 84.

When the cover 9 is rotated from the closed position to the open position, the projection 86 moves upward in response to the rotation of the cover 9. In response to the movement of the projection 86, the actuator 83 moves from the lower position to the upper position. When the actuator 83 is put in the upper position, the signal transmitted through the sensor harness 84 is switched from the ON signal to the OFF signal. When the cover 9 is further rotated, as shown in FIG. 7, the projection 86 is separated away from the insertion hole 85.

<Operations and Advantageous Effects>

As described above, the cover 9 is rotatable between the open position and the closed position. When the cover 9 is in the open position, the upper path 34 is open, and the second LF roller 49 is exposed. Therefore, in the case where a jam of a sheet S occurs while the sheet S is being conveyed through the upper path 34, it is possible to set the cover 9 in the open position and settle the jam.

Further, the detector 81 and the motor 73 are disposed on the same side in the front-to-rear direction with respect to the feed tray 41. Thereby, it is possible to easily lay the sensor harness 84 to be connected with the detector 81 and the motor harness 76 to be connected with the motor 73 on the same path. Therefore, it is possible to easily achieve a simple layout of the sensor harness 84 connected with the detector 81 and the motor harness 76 t connected with the motor 73. In addition, it is possible to dispose the detector 81 in a space around the motor 73. Therefore, it is possible to make effective use of the space around the motor 73 and reduce a dead space.

Thus, it is possible to achieve a simple layout of the motor harness 76 and the sensor harness 84 and downsize the image reading unit 3.

The motor harness 76 connected with the motor 73 extends from the motor 73 toward the detector 81.

According to the configuration, it is possible to easily lay the motor harness 76 connected with motor 73 on the same path as the sensor harness 84 connected with the detector 81. Thus, it is possible to easily achieve a simpler layout of the motor harness 76 and the sensor harness 84.

The detector 81 is disposed opposite to the rotational axis 21 of the cover 9 with respect to the motor 73 in the left-to-right direction, i.e., disposed on the right side of the motor 73.

According to the configuration, the detector 81 is located farther away from the rotational axis 21 than when the detector 81 is disposed on the same side as the rotational axis 21 with respect to the motor 73. As the detector 81 is farther away from the rotational axis 21, the detector 81 is allowed to detect a state where the cover 9 is closed (open) at a smaller open angle as a closed state of the cover 9. Accordingly, it is possible to detect a state where the cover 9 is closed up to a smaller open angle as the closed state of the cover 9 than when the detector 81 is disposed on the same side as the rotational axis 21 with respect to the motor 73. Thus, it is possible to accurately detect the closed state of the cover 9.

As shown, e.g., in FIG. 8, the rear end of the sensor 82 of the detector 81 is disposed in the same position as the front end of the motor 73 in the front-to-rear direction. Further, as shown, e.g., in FIG. 8, a part of the detector 81 is disposed in the same position as a part of the motor 73 in the left-to-right direction. Moreover, as shown, e.g., in FIGS. 6 and 7, a part of the detector 81 is disposed in the same position as a part of the motor 73 in the vertical direction.

Thereby, it is possible to reduce a space for disposing the detector 81 and the motor 73 in the front-to-rear direction, the left-to-right direction, and the vertical direction.

The detector 81 is provided at the motor frame 72 configured to support the motor 73.

According to the configuration, it is possible to use the motor frame 72 for supporting the detector 81. Namely, it is possible to use the motor frame 72 for supporting both the motor 73 and the detector 81. Thereby, it is possible to reduce the number of components constituting the image reading unit 3. Consequently, it is possible to reduce the size of the image reading unit 3 and the cost for manufacturing the image reading unit 3.

Further, the detector 81 is disposed on a rear side opposite to the operation unit 7 with respect to the feed tray 41.

In general, the user holds a front portion of the cover 9 from the front side where the operation unit 7 is disposed, and opens and closes the cover 9. Therefore, when the cover 9 is closed, and a front side of the cover 9 is in the closed position, a rear side of the cover 9 may float higher than the closed position. According to such a configuration that the detector 81 is disposed on the rear side opposite to the operation unit 7 with respect to the feed tray 41, it is possible to detect a state where the rear side of the cover 9 is in the closed position, in a favorable manner using the detector 81. Thus, it is possible to detect a state where the front and rear sides of the cover 9 are in the closed position as the closed state in a favorable manner.

<Sheet Width Guides>

Figure 9:
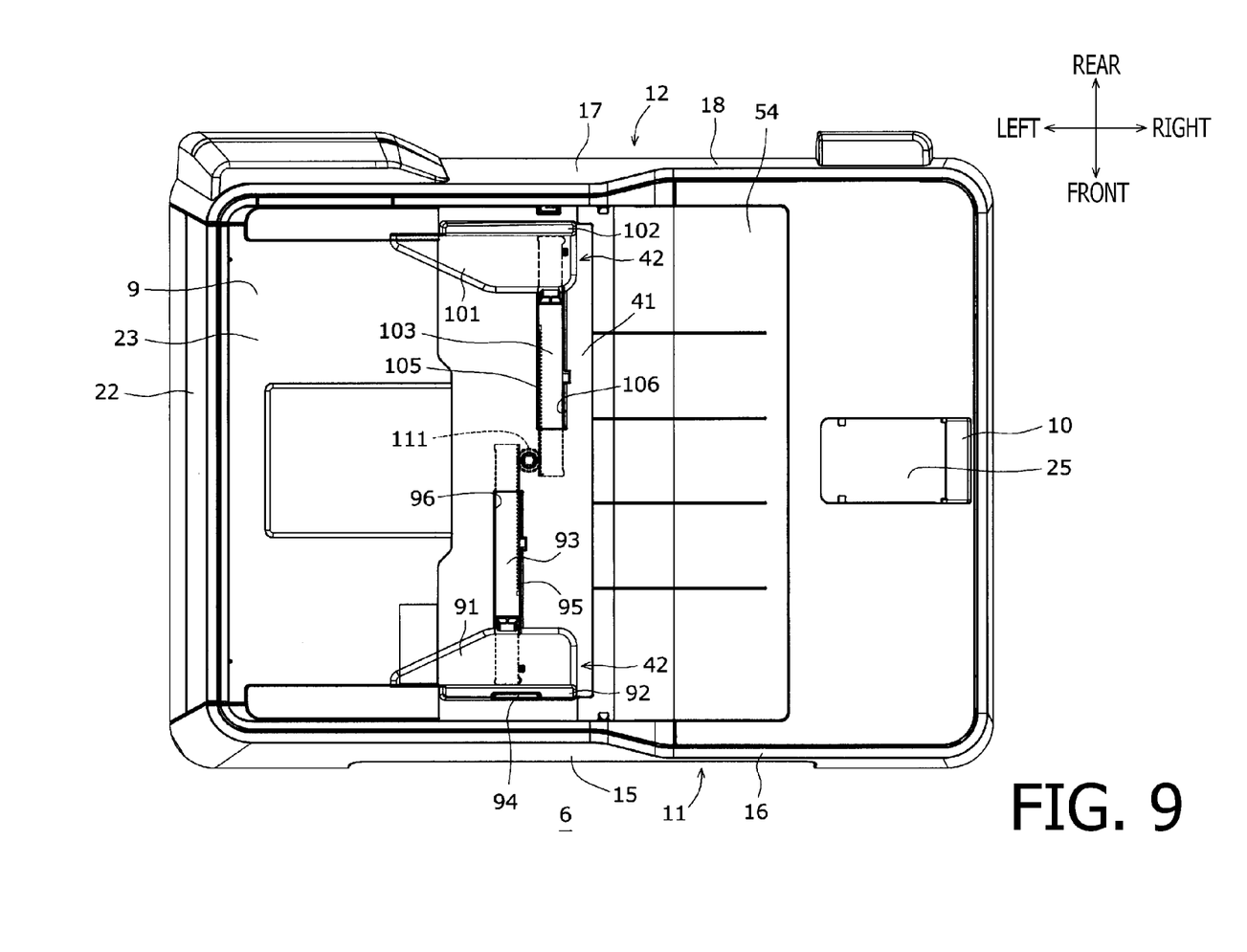
FIG. 9 is a top view showing the ADF housing in a state where a tray is removed in the embodiment according to one or more aspects of the present invention.

As shown in FIG. 9, the front width guide 42 includes a base plate 91, a guide plate 92, and a rack 93.

The base plate 91 is disposed on the feed tray 41, and extends along the upper face of the feed tray 41. A front end of the base plate 91 linearly extends in the left-to-right direction.

The guide plate 92 extends upward from the front end of the base plate 91. The guide plate 92 includes a grip portion 94. The grip portion 94 is formed as a concave portion recessed rearward from a front face of the guide plate 92, at a middle portion of an upper end portion of the guide plate 92 in the left-to-right direction.

The rack 93 extends rearward from a lower face of the base plate 91, behind a left end portion of the grip portion 94. The rack 93 includes a rack gear 95 formed at a right end face of the rack 93.

Figure 3:
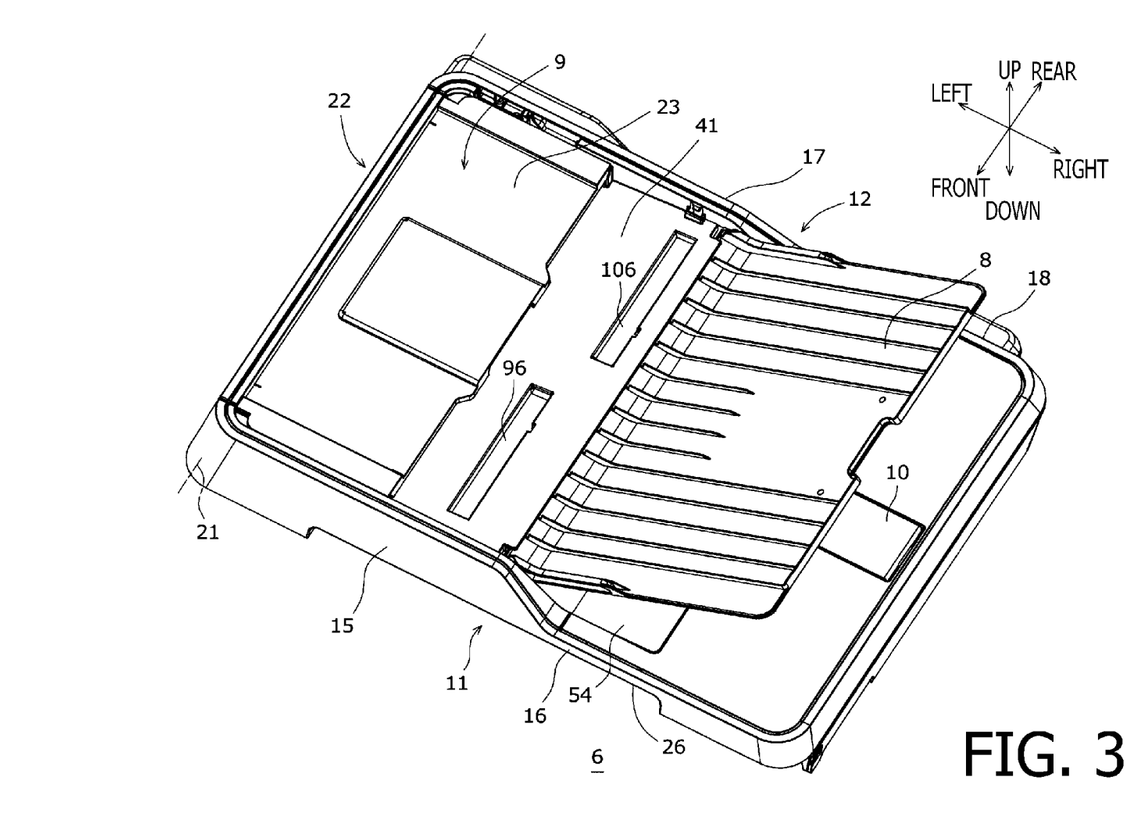
FIG. 3 is a perspective view, from the upper right front side, of an ADF housing of the image reading unit in a state where width guides are removed, and a cover is in a closed position in the embodiment according to one or more aspects of the present invention.

The rack 93 is placed in a rack compartment 96 formed at the feed tray 41. As shown in FIGS. 3 and 4, the rack compartment 96 is formed as a concave portion extending in the front-to-rear direction, at a front portion of the upper face of the feed tray 41. The rack compartment 96 opens rearward. A rear end portion of the rack 93 protrudes rearward from the rack compartment 96, and is located under the feed tray 41.

As shown in FIG. 9, the rear width guide 42 includes a base plate 101, a guide plate 102, and a rack 103.

The base plate 101 is disposed on the feed tray 41, and extends along the upper face of the feed tray 41. A rear end of the base plate 91 linearly extends in the left-to-right direction.

The guide plate 102 extends upward from the rear end of the base plate 101.

The rack 103 extends rearward from a lower face of a right end portion of the base plate 101. The rack 103 is on the right side of the rack 93 of the front width guide 42. The rack 103 includes a rack gear 105 formed at a left end face of the rack 103.

The rack 103 is placed in a rack compartment 106 formed at the feed tray 41. As shown in FIGS. 3 and 4, the rack compartment 106 is formed as a concave portion extending in the front-to-rear direction, at a rear portion of the upper face of the feed tray 41. The rack compartment 106 opens frontward. A front end portion of the rack 103 protrudes frontward from the rack compartment 106, and is located under the feed tray 41.

As shown in FIG. 9, the feed tray 41 includes a pinion gear 111. The pinion gear 111 is disposed in a central area in the front-to-rear direction under the feed tray 41. The pinion gear 111 is configured to rotate around a rotational axis perpendicular to the upper face of the feed tray 41. The rack gear 95 of the rack 93 engages with the pinion gear 111 from the left. The rack gear 105 of the rack 103 engages with the pinion gear 111 from the right.

In order to move the two width guides 42, the user holds the grip portion 94 of the front width guide 42 with a user's hand (fingers). Then, the front width guide 42 is moved along the front-to-rear direction.

When the front width guide 42 is moved rearward, the rack 93 moves rearward. In response to the rearward movement of the rack 93, the pinion gear 111 rotates clockwise in a top view (e.g., in FIG. 9). In response to the clockwise rotation of the pinion gear 111, the rack 103 of the rear width guide 42 moves frontward. A rotation amount of the pinion gear 111 corresponds to a moving distance of the rack 93. A moving distance of the rack 103 corresponds to the rotation amount of the pinion gear 111. Thus, the two width guides 42 move closer to each other by the same moving distance relative to a position of the pinion gear 111.

When the front width guide 42 is moved frontward, the rack 93 moves frontward. In response to the frontward movement of the rack 93, the pinion gear 111 rotates counterclockwise in the top view (e.g., in FIG. 9). In response to the counterclockwise rotation of the pinion gear 111, the rack 103 of the rear width guide 42 moves rearward. A rotation amount of the pinion gear 111 corresponds to a moving distance of the rack 93. A moving distance of the rack 103 corresponds to the rotation amount of the pinion gear 111. Thus, the two width guides 42 move farther away from each other by the same moving distance relative to the position of the pinion gear 111.

The rack 93 of the front width guide 42 is located substantially in the same position as the grip portion 94 in the left-to-right direction. Therefore, when a force to move the front width guide 42 along the front-to-rear direction is applied to the grip portion 94, it is possible to smoothly move the rack 93 along the front-to-rear direction.

<Stopper>

Figure 10:
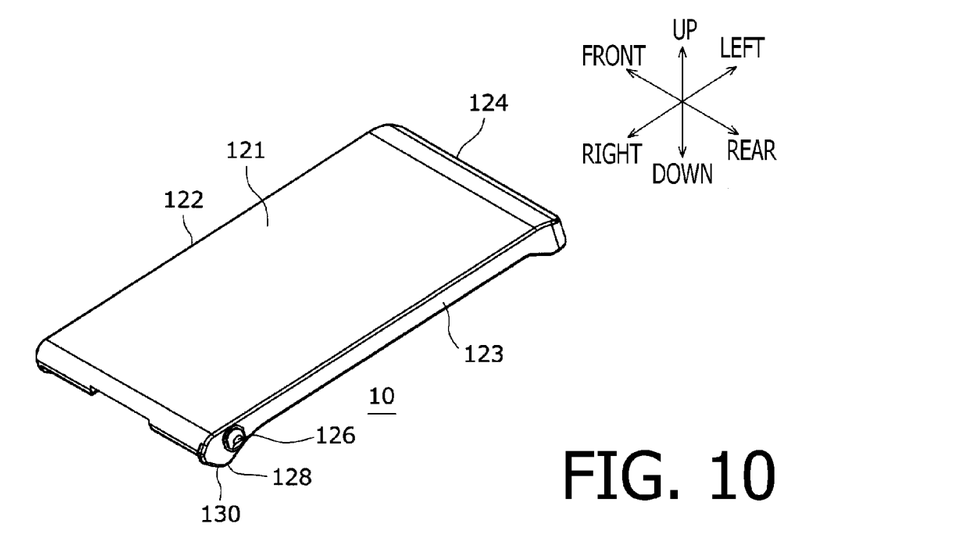
FIG. 10 is a perspective view, from an upper right rear side, of a stopper attached to the ADF housing in the embodiment according to one or more aspects of the present invention.
Figure 11:
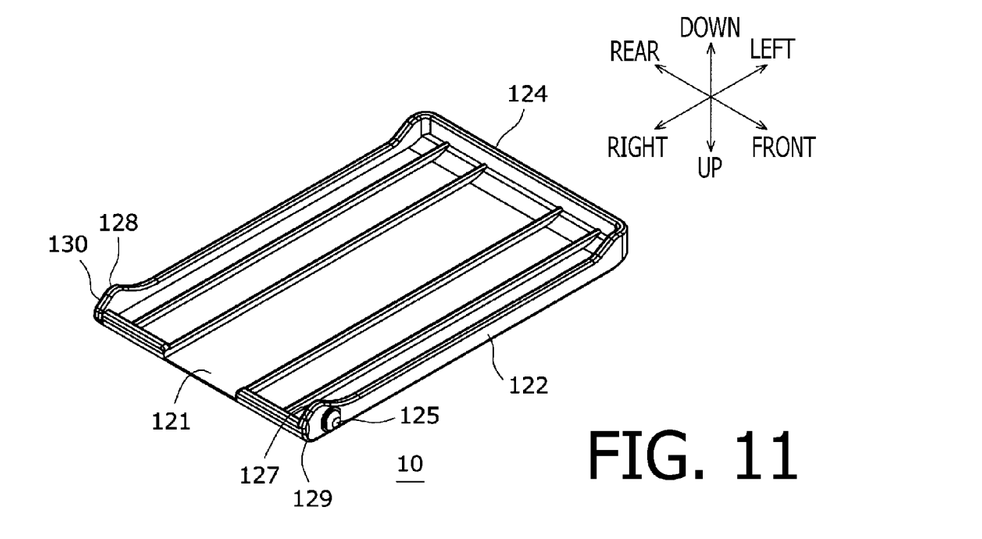
FIG. 11 is a perspective view of the stopper from a lower right front side in the embodiment according to one or more aspects of the present invention.

As shown in FIGS. 10 and 11, the stopper 10 includes a main body 121, a front end portion 122, a rear end portion 123, a left end portion 124, a front shaft 125, and a rear shaft 126.

The main body 121 is formed in a plate shape extending in the front-to-rear direction and the left-to-right direction.

The front end portion 122 extends downward from a front end of the main body 121, and extends in the front-to-rear direction along the front end of the main body 121. The front end portion 122 includes a swelling section 127 formed to swell downward and provided at a right end of the front end portion 122.

The rear end portion 123 extends downward from a rear end of the main body 121, and extends in the front-to-rear direction along the rear end of the main body 121. The rear end portion 123 includes a swelling section 128 formed to swell downward and provided at a right end of the rear end portion 123.

The left end portion 124 extends downward from a left end of the main body 121. The left end portion 124 connects a left end of the front end portion 122 with a left end of the rear end portion 123.

The front shaft 125 protrudes frontward from a right end of the front end portion 122.

The rear shaft 126 protrudes rearward from a right end of the rear end portion 123.

A section 129 between a lower end of the swelling section 127 and the right end of the front end portion 122 swells more toward a lower right side than a section 130 between a lower end of the swelling section 128 and the right end of the rear end portion 123.

Figure 12:
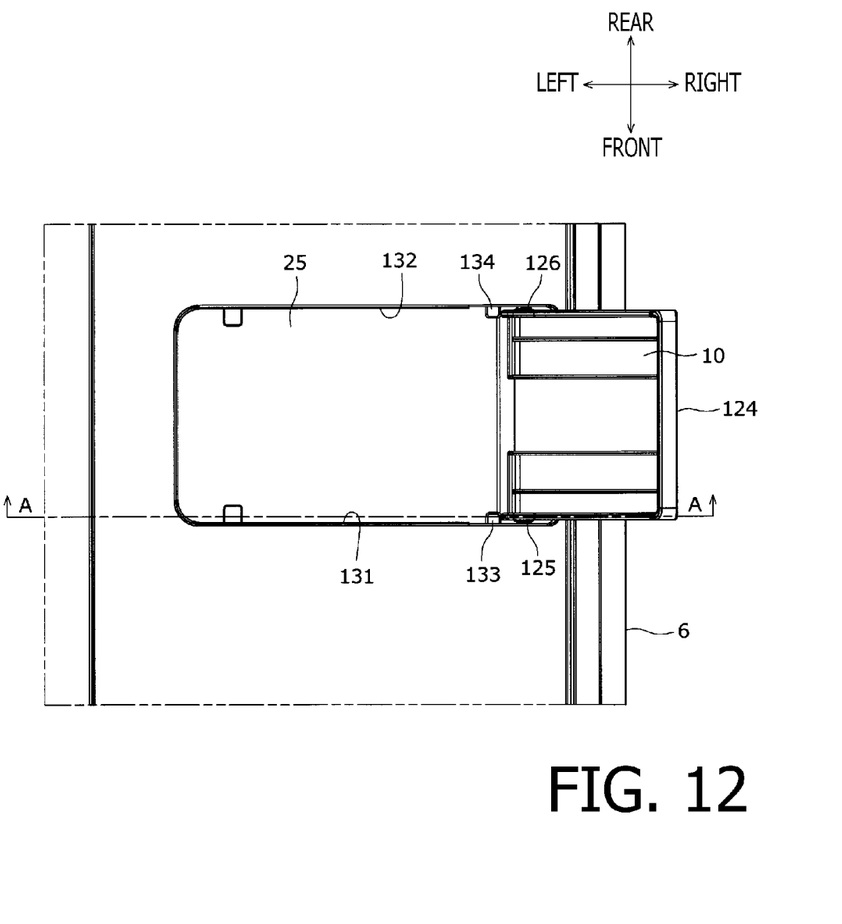
FIG. 12 is a top view showing a right end portion of the ADF housing in the embodiment according to one or more aspects of the present invention.

As shown in FIG. 12, the front shaft 125 is fitted into a bearing concave section (not shown) formed at a right end portion of a front wall surface 131 of the concave portion 25, from behind. On the other hand, the rear shaft 126 is fitted into a bearing concave section (not shown) formed at a right end portion of a rear wall surface 132 of the concave portion 25, from the front. Thereby, the stopper 10 is rotatably supported by the front shaft 125 and the rear shaft 126 as a fulcrum.

Figure 13:
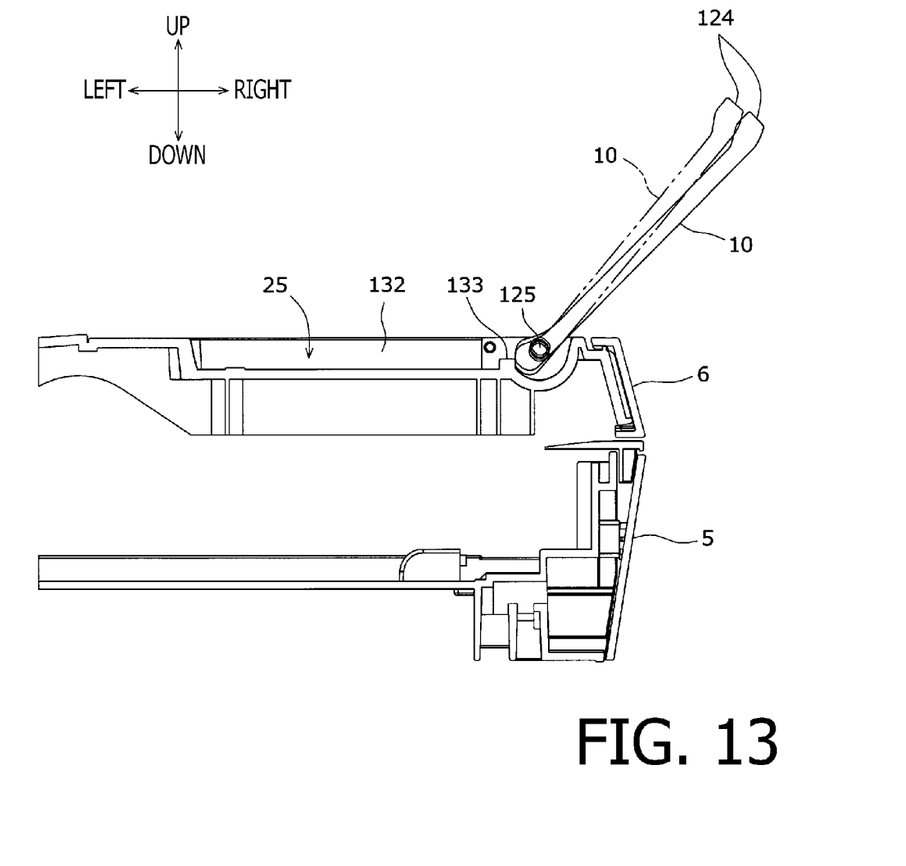
FIG. 13 is a cross-sectional front view of the ADF housing taken along a cutting-plane line A-A shown in FIG. 12 in the embodiment according to one or more aspects of the present invention.

As shown in FIGS. 12 and 13, the ADF housing 6 includes two rotation stoppers 133 and 134. The rotation stopper 133 is disposed on the left side of the swelling section 127 of the front end portion 122. The rotation stopper 134 is disposed on the left side of the swelling section 128 of the rear end portion 123.

When the stopper 10 is in the deployed position indicated by an alternate long and two short dashes line in FIG. 13, the swelling sections 127 and 128 contact the rotation stoppers 133 and 134 from the right, respectively. Thereby, the stopper 10 is prevented from further opening from the deployed position and held in the deployed position.

When a clockwise force in the front view is applied to the stopper 10 held in the deployed position, as shown by a solid line in FIG. 13, the stopper 10 is further opened to such the section 129 between the lower end of the swelling section 127 and the right end of the front end portion 122 strongly hits the rotation stopper 133. Then, the section 129, which hits the rotation stopper 133, receives a reaction force from the rotation stopper 133. The reaction force causes the front shaft 125 to be withdrawn from the bearing concave section (not shown). Consequently, the stopper 10 is detached from the ADF housing 6.

Thus, when the stopper 10 is further opened from the deployed position, the stopper 10 is detached from the ADF housing 6. Therefore, it is possible to prevent the ADF housing 6 or the stopper 10 from being damaged.

Hereinabove, the embodiment according to aspects of the present invention have been described. The present invention can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present invention. However, it should be recognized that the present invention can be practiced without reapportioning to the details specifically set forth. In other instances, well known processing structures have not been described in detail, in order not to unnecessarily obscure the present invention.

An only exemplary embodiment of the present invention and but a few examples of their versatility are shown and described in the present disclosure. It is to be understood that the present invention is capable of use in various other combinations and environments and is capable of changes or modifications within the scope of the inventive concept as expressed herein. For example, the following modifications are possible. It is noted that, in the following modifications, explanations of the same configurations as exemplified in the aforementioned embodiments will be omitted.

<Modifications>

In the aforementioned embodiment, a part of the detector 81 is positionally coincident with a part of the motor 73 in each direction of the front-to-rear direction, the left-to-right direction, and the vertical direction. However, at least a part of the detector 81 may be positionally coincident with at least a part of the motor 73 in at least one direction of the front-to-rear direction, the left-to-right direction, and the vertical direction. For example, at least a part of the detector 81 may be positionally coincident with at least a part of the motor 73 in each of the front-to-rear direction and the vertical direction.

The detector 81 may include a reflection type photosensor configured to detect reflected light from the projection 86 of the cover 9 in the closed position.

In this respect, however, when the detector 81 includes a reflection type photosensor, a distance between the detector 81 and the motor 73 have to be secured. Further, such a configuration that the detector 81 includes a reflection type photosensor might lead to misdetection due to outside light.

On the contrary, when the detector 81 includes a mechanical switch, the detector 81 is allowed to be disposed close to the motor 73. Therefore, it is possible to achieve a smaller space for accommodating the detector 81 and the motor 73 than when the detector 81 includes a reflection type photosensor instead of a mechanical switch. Consequently, it is possible to downsize the image reading unit 3. Further, it is possible to prevent misdetection due to outside light.

In the aforementioned embodiment, exemplified is the image forming unit 3 configured to read an image on each side of a sheet S while the sheet S is being conveyed. However, aspects of the present invention may be applied to an image reader configured to read an image on a single side of a sheet S while the sheet S is being conveyed.

What is claimed is:

1. An image reader comprising:
    a housing;
    a sheet support surface disposed at the housing and configured to support a sheet placed thereon;
    a conveyor comprising a roller, the conveyor configured to convey in a first direction the sheet placed on the sheet support surface;
    a drive unit configured to generate a driving force for driving the conveyor;
    an image sensor unit configured to read an image on the sheet being conveyed by the conveyor;
    a cover configured to rotate between an open position to expose the roller and a closed position to cover the roller, around a rotational axis extending in a second direction perpendicular to the first direction; and
    a detector configured to output a first signal when the cover is in the closed position and output a second signal different from the first signal when the cover is in the open position, the detector disposed on a same side as the drive unit with respect to the sheet support surface in the second direction.

2. The image reader according to claim 1,
    wherein the detector is disposed opposite to the rotational axis with respect to the drive unit in the first direction.

3. The image reader according to claim 1,
    wherein at least a part of detector is positionally coincident with at least a part of the drive unit in at least one direction of the first direction, the second direction, and a third direction perpendicular to the first and second directions.

4. The image reader according to claim 3,
    wherein at least a part of detector is positionally coincident with at least a part of the drive unit in each direction of the first direction, the second direction, and the third direction.

5. The image reader according to claim 1, further comprising a drive harness configured to connect with the drive unit, the drive harness extending from the drive unit toward the detector in the first direction.

6. The image reader according to claim 5, further comprising a detector harness configured to connect with the detector, the detector harness extending from the detector toward a first side in the first direction,
    wherein the drive harness extends from the drive unit toward a second side opposite to the first side in the first direction, and, after being turned around, then extends substantially along the detector harness, from the detector toward the first side in the first direction.

7. The image reader according to claim 1, further comprising a drive frame configured to support the drive unit and the detector.

8. The image reader according to claim 1,
    wherein the detector comprises a mechanical switch comprising an actuator configured to contact a part of the cover in the closed position.

9. The image reader according to claim 8,
    wherein the cover comprises a contact member configured to contact the actuator of the mechanical switch when the cover is in the closed position.

10. The image reader according to claim 1, further comprising an operation unit disposed at the housing, the operation unit disposed opposite to the detector with respect to the sheet support surface in the second direction, the operation unit configured to accept an operation.

* * * * *